H. C. MALLORY.
PROCESS OF REGULATING HEATING DEVICES.
APPLICATION FILED MAY 20, 1903.

963,007.

Patented June 28, 1910.

3 SHEETS—SHEET 1.

WITNESSES:

INVENTOR
Harry C. Mallory
BY
ATTORNEY.

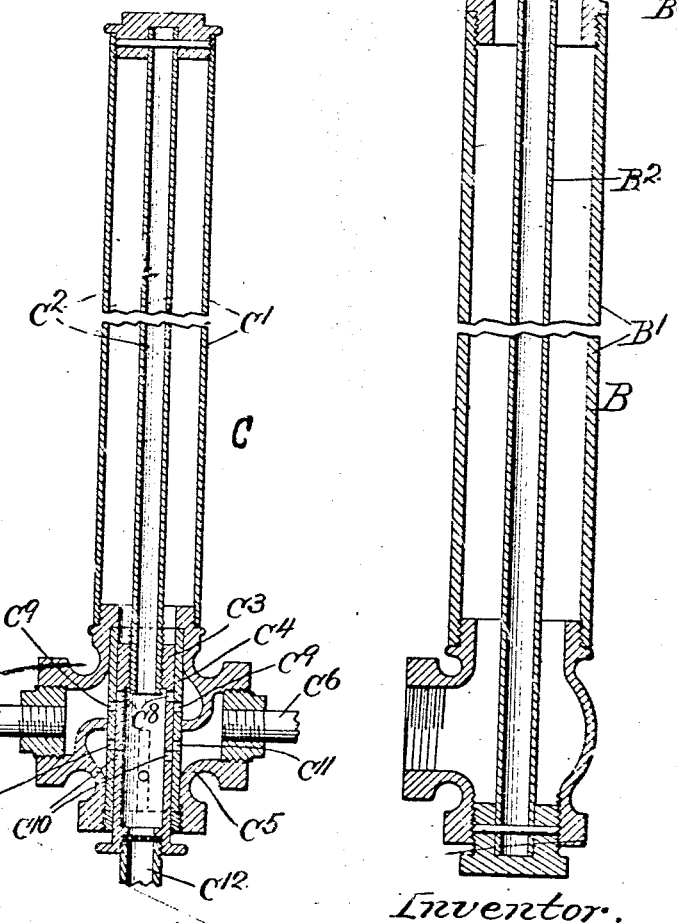

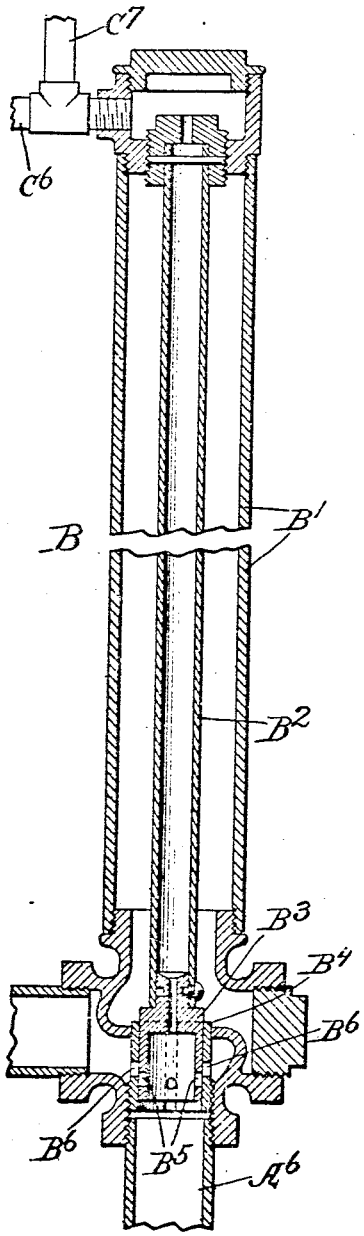
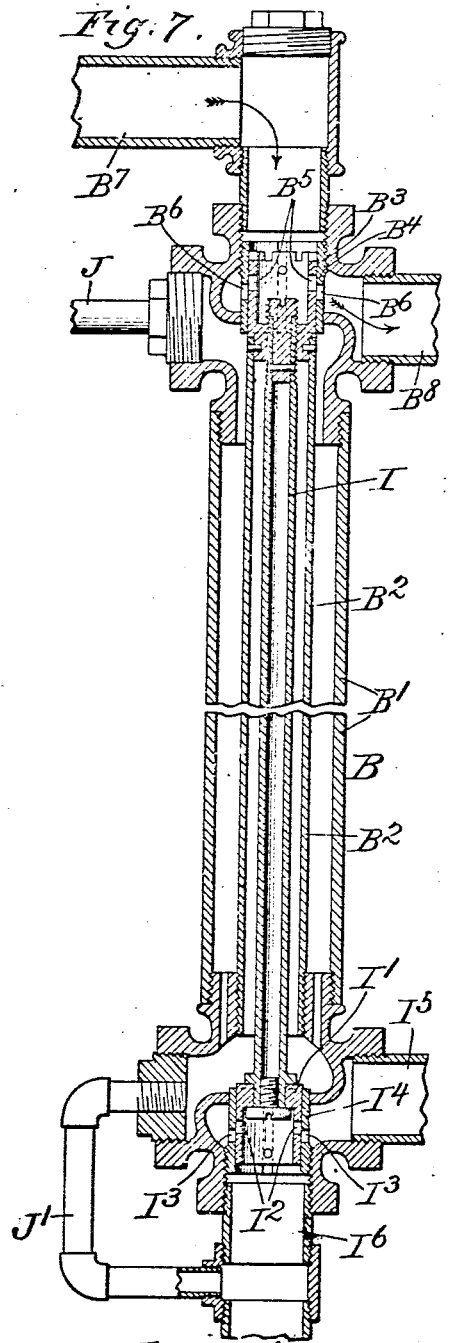

UNITED STATES PATENT OFFICE.

HARRY C. MALLORY, OF CHICAGO, ILLINOIS.

PROCESS OF REGULATING HEATING DEVICES.

963,007.
Specification of Letters Patent.
Patented June 28, 1910.

Application filed May 20, 1903. Serial No. 158,040.

*To all whom it may concern:*

Be it known that I, HARRY C. MALLORY, a citizen of the United States, residing at Chicago, in the county of Cook and State of Illinois, have invented a certain new and useful Improvement in a Process of Regulating Heating Devices, of which the following is a specification.

My invention relates to a process of regulating heating devices or systems, and has for its object to provide a new and improved process of this description.

My invention is illustrated in the accompanying drawings, wherein—

Figure 1:
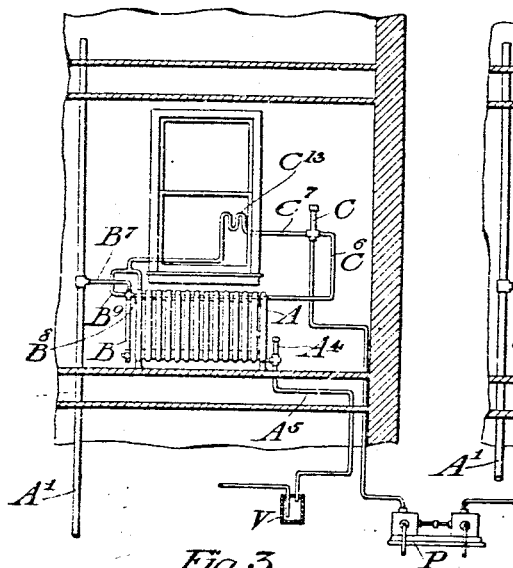
Figure 2:
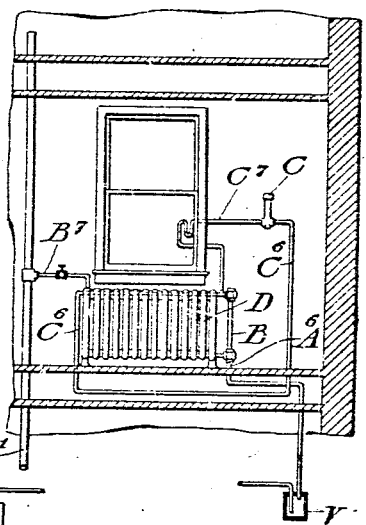
Figure 3:
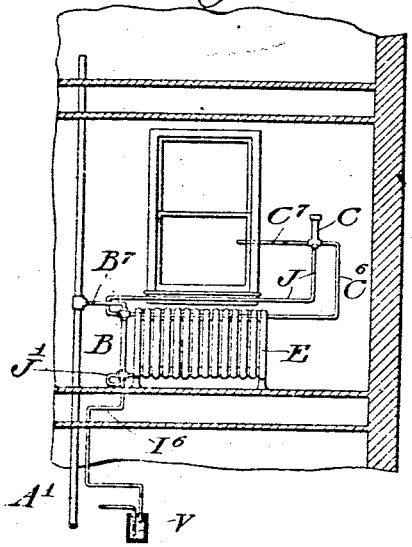

Figure 1 is a diagrammatic view showing a system provided with means for carrying my process into effect. Figs. 2 and 3 are similar views showing modifications of the means for effecting my process. Fig. 4 is a sectional view illustrating one form of controlling valve associated with the heater. Fig. 5 is a sectional view of one form of thermostatic controlling device. Fig. 6 is a sectional view of another form of controlling valve. Fig. 7 is a sectional view showing still another form of the controlling valve for the heater.

Like letters refer to like parts throughout the several figures.

My present invention relates to heating systems in which the circulation of the heating fluid through radiators, or the like, is directly controlled by a thermostatic valve which acts on the steam inlet to a radiator or the outlet from a radiator for water of condensation, or upon both the steam inlet and water outlet of the radiator.

The object of the invention is the more efficient regulation of the thermostatic valve referred to and of the circulation controlled by the valve, and this I accomplish by subjecting the thermostatic mechanism of the valve to the action of a stream of heating or cooling fluid which is forced to flow through or by said mechanism, as well when the thermostatic valve is closed as when it is open, and as it passes said mechanism rapidly heats or cools the latter as desired.

An important feature of my invention consists in creating the flow of a stream of heating or cooling fluid when a low pressure escape conduit from the radiator regulated is employed, by the difference between the pressure of the atmosphere and the pressure in said escape conduit. In the apparatus shown in the drawings for utilizing the invention, the flow of said stream through or by the thermostatic mechanism is controlled by a thermostatic pilot valve, the action of which can be determined by the temperature of a room to be heated or of some other place of varying temperature.

My new process can be carried into effect with apparatus of many forms, and in the drawings I have illustrated several forms of apparatus, all new with me, but not claimed in this application, which will be limited in scope to the method common to all the forms of apparatus disclosed. It is my intention to cover the apparatus disclosed in separate patents.

Referring now to Fig. 1 of the drawings, wherein I have illustrated, diagrammatically, a heating system, I have shown the source of supply of heating fluid as the pipe A'.

I have shown various devices associated with different radiators. Referring to the radiator A, of Fig. 1, I have shown a valve B which may be called a thermo-motor valve. The steam is admitted to this radiator at the top and the admission of steam is controlled automatically so as to supply the proper amount required to maintain a substantially uniform temperature in the apartment. This valve B is illustrated in Fig. 4 and consists of an outer member B', preferably of material having a low coefficient of expansion, as iron, and an inner member B² of a material having a higher coefficient of expansion, as brass. The member B² is preferably adjustably connected with the member B' and is provided at one end with a piston B³ working in a surrounding part or casing B⁴. The piston is provided with ports or openings B⁵ adapted to co-act with the ports or openings B⁶ in the casing. Steam enters the valve by the pipe B⁷, passes into the hollow piston, and if the ports B⁵ and B⁶ register, will pass therethrough and enter the radiator by means of pipe B⁸. Air of different temperatures is made to enter the valve through pipe B⁹ and passes between the two members so as to contract or expand the member B², and thus change the relative position of the ports B⁵ and B⁶.

Referring now to Fig. 1, I have shown a thermostat C on the wall, responsive to variations in temperature of the apartment to be heated and adapted to control the air passing through the valve B. One form of thermostat for this purpose is illustrated in Fig. 5 and consists of an outer member C' and an inner member C² of different coefficients of expansion, the member C' being of a material having preferably the higher coefficient of expansion. The member C² is provided with a piston C³, surrounded by the sleeve C⁴ within the valve casing or fitting C⁵. The casing C⁵ is provided with two chambers, one connecting with the pipe C⁶ and the other with the pipe C⁷. The piston C³ is provided with the ports C⁸, adapted to coöperate with the ports C⁹ in the sleeve C⁴ and communicating with the chamber associated with the pipe C⁷. Said piston is also provided with the ports C¹⁰, coöperating with the ports C¹¹ in the sleeve C⁴ and communicating with the chamber in the casing associated with pipe C⁶. The piston C³ is hollow and the end communicates with the pipe C¹², leading to a source of air supply shown as the pump P. The pipe C⁷ passes to the external atmosphere and is preferably provided with a coil C¹³ exterior to the building, and then passes to the pipe B⁹. The pipe C⁷ might be associated with another source of supply of cold air, but I have explained the most convenient source. The pipe C⁶ passes in proximity to the radiator so as to be heated thereby, and preferably through the upper part, as shown, and then communicates with the pipe B⁹. In this event the air in the pipe C⁶ is heated. It is of course evident that said pipe may be associated with any other source of heated air, if desired.

When the room is at the proper temperature the piston of the thermostatic device is in such position as to close the ports C⁹ and C¹¹ and no air is forced through the valve B. If now, the temperature in the apartment rises above the predetermined point the outer member of the thermostat expands and the piston C³ is moved upwardly and the ports C¹⁰ are made to register with the ports C¹¹, thus connecting the source of air supply with the pipe C⁶. As this pipe passes through or near the radiator the air in it is warmed and this warm air is passed through the valve B. This causes the member B² to expand and the piston B³ is moved upwardly so as to decrease the amounts of the ports B⁵ and B⁶ which register, thus decreasing the quantity of steam admitted to the radiator. The ports will be so adjusted as to secure the proper admission to maintain a uniform temperature. If, on the other hand, the temperature in the apartment falls below the predetermined point, the thermostat is acted upon by the temperature of the apartment so as to move the piston C³ downwardly, thus causing the ports C⁸ and C⁹ to register. This connects the source of air supply with the pipe C⁷ containing the cold air and this cold air is forced through the valve. The member C² of said valve, (Fig. 4), is then moved downwardly so as to increase the area of the ports in the valve and its surrounding part, thus increasing the amount of steam which enters the radiator. It will thus be seen that by proper adjustment and arrangement of the parts a uniform temperature may be maintained in the apartment. The water of condensation is removed in any desired mann, as for example, by the thermostatic valve A⁴ and the pipe A⁵ connected to a vacuum chamber or hot well V.

Referring now to radiator D, Fig. 2, the regulation is performed by regulating the discharge of the water of condensation by means of a valve similar to the valve B, except that it is inverted. This valve is illustrated in Fig. 8. The thermostat on the wall in this case is similar to that shown in connection with radiator A. In this case there is no source of air supply used, but the valve B is connected to the exhaust device or chamber V, by means of the pipe A⁵, and hence when the thermostatic valve on the wall is connected with either pipe C⁶ or C⁷, the cold or warm air is drawn through the valve by this exhaust device. The amount of steam admitted is controlled by the amount of water of condensation permitted to accumulate in the radiator and this water is drawn out automatically by the valve B in response to variations in the temperature of the apartment acting on thermostat C. If, for example, the temperature falls below the predetermined point, cold air is forced through the valve B so as to contract the inner member B² and move the piston B³ so that a greater amount of the coöperating ports register, thus permitting more water of condensation to escape. This permits the introduction of more steam and raises the temperature of the apartment. When the temperature of the apartment rises too high, warm air is forced through the valve and the inner member expanded so as to move the piston to reduce the area of registration of the coöperating parts, thus decreasing the amount of water of condensation permitted to escape.

In radiator E, Fig. 3, I have shown a construction where both the admission of the steam and the escape of the water of condensation are controlled by a compound thermo-motor valve, such a valve being illustrated in Fig. 6. This valve consists of the outer member B' and the inner member B² to which the piston B³ is connected, and within the member B², is another member I, preferably having a very low coefficient of expansion, and to this member is connected a piston I' provided with ports I² coöperating with ports I³ in a surrounding sleeve I⁴ communicating with the pipe I⁵, through which the water of condensation passes from the radiator. The piston is hollow and communicates with the pipe I⁶, through which the water of condensation is led away, said pipe being preferably connected to some exhaust device, as shown. A pipe J leads from the bottom of thermostat C to the valve. The hollow portion of the valve is connected by pipe J' with the exhaust device V so that the hot and cold air is drawn through by means of this exhaust device. This device works in the same way as heretofore described, except that it controls both the admission of the steam and the discharge of the water of condensation. If, for example, the temperature of the apartment falls, cold air is passed through the valve, causing the member B² to contract. This lowers piston B³ and piston I', thus increasing the amount of the ports in each which register with the corresponding ports, and thus increasing the amount of steam admitted and the amount of water discharged. When the temperature rises, the warm air is passed through the valve and the opposite movement of the ports results.

I have illustrated some particular mechanisms for carrying out my process, but it is of course evident that other appliances may be used, and I simply suggest the device as herein illustrated in order to clearly show some definite means of carrying out the process.

Having now described my invention, what I claim as new and desire to secure by Letters Patent is—

1. The process of regulating the heating effect of a heating device having a low pressure escape pipe and a thermostatic valve for directly controlling the flow of a heating fluid through the device, which process consists in employing the difference between the pressure of the atmosphere and that in the escape pipe to cause a stream of a fluid temperature changing medium to flow when said valve is closed as well as when it is open, and directing said stream against the thermostatic actuating mechanism of the valve.

2. The process of regulating the heating effect of a heating device having a low pressure escape pipe and a thermostatic valve for directly controlling the flow of a heating fluid through the device, which process consists in employing the difference between the pressure of the atmosphere and that in the escape pipe to cause a stream of air to flow when said valve is closed as well as when it is open, and directing said stream against the thermostatic actuating mechanism of said valve.

3. The process of regulating the heating effect of a heating device having a low pressure escape pipe and a thermostatic valve for directly controlling the flow of a heating fluid through the device, which process consists in employing the difference between the pressure of the atmosphere and that in the escape pipe to cause a stream of a fluid temperature changing medium to flow when said valve is closed as well as when it is open, and directing said stream against the thermostatic actuating mechanism of the valve, and varying the influence of said stream on said actuating mechanism in response to variations in the temperature of the apartment heated by said device.

4. The process of regulating the heating effect of a heating device having a low pressure escape pipe and a thermostatic valve for directly controlling the flow of a heating fluid through the device, which process consists in employing the difference between the pressure of the atmosphere and that in the escape pipe to cause a stream of air of the temperature of the external atmosphere to flow when said valve is closed as well as when it is open, and directing said stream against the thermostatic actuating mechanism of the valve, and varying the influence of said stream on said actuating mechanism in response to variations in the temperature of the apartment heated by said device.

5. The process of regulating the heating effect of a heating device having a low pressure escape pipe and a thermostatic valve for directly controlling the flow of a heating fluid through the device, which consists in creating a flow, when said valve is closed as well as when it is open, of a stream of a fluid temperature changing medium from a source of said medium under pressure exceeding that of said escape pipe, by the difference between the pressure of the fluid in said source and the pressure in said escape pipe, and directing said stream against the thermostatic actuating mechanism of the valve.

6. The process of securing efficient regulation of heating devices in which the circulation of heating fluid is directly controlled by a thermostatic valve, which process consists in subjecting said thermostatic actuating mechanism of said valve to a stream of a cooling medium, or to a stream of a heating medium, respectively, as the temperature of the apartment heated fluctuates to one side or to the other of a predetermined degree, maintaining the flow of one or the other of said mediums as the temperature conditions of said apartment may require during the period of such fluctuations, and interposing a positive barrier to the flow of one medium while the flow of the other is maintained.

7. The process of regulating the heating effect of a heating device having a low pressure escape pipe and a thermostatic valve for controlling the flow of a heating fluid through the device, which process consists in employing the difference between the pressure of the atmosphere and that in the escape pipe to cause a stream of air of the temperature of the external atmosphere to flow when said valve is closed as well as when it is open, directing said stream against the thermostatic actuating mechanism of the valve, and varying the influence of said stream on said actuating mechanism as the temperature conditions of the apartment heated may require.

8. The process of regulating the heating effect of a heating device having a low pressure escape pipe and a thermostatic valve for controlling the flow of a heating fluid through the device, which consists in employing the difference between the pressure of the atmosphere and that in the escape pipe to cause a stream of air to flow when said valve is closed as well as when it is open, directing said stream against the thermostatic actuating mechanism of the valve and varying the temperature of said stream to thereby vary the actuation of said valve as the temperature conditions in the apartments heated may require.

9. The process of securing efficient regulation of the heating effect of a heating device having a low pressure escape pipe and a thermostatic valve for controlling the flow of a heating fluid through the device, which consists in employing the difference between the pressure in the atmosphere and that in the escape pipe to cause a stream of a fluid temperature changing medium to flow when said valve is closed as well as when it is open, directing said stream against the thermostatic actuating mechanism of the valve, and utilizing two supplies of air of different temperatures as sources from which said stream is drawn to thereby regulate the action of the stream on said thermostatic valve mechanism.

HARRY C. MALLORY.

Witnesses:
 HOMER L. KRAFT,
 FANNY B. FAY.